(12) United States Patent
Beaujot et al.

(10) Patent No.: US 10,106,333 B2
(45) Date of Patent: Oct. 23, 2018

(54) OPERATING GRANULAR MATERIAL CONVEYORS NEAR CAPACITY

(71) Applicant: SEEDMASTER MANUFACTURING LTD., Emerald Park (CA)

(72) Inventors: Norbert Beaujot, Emerald Park (CA); Owen Kinch, Emerald Park (CA)

(73) Assignee: SeedMaster Manufacturing Ltd., Emerald Park, SK (CA)

( * ) Notice: Subject to any disclaimer, the term of this patent is extended or adjusted under 35 U.S.C. 154(b) by 218 days.

(21) Appl. No.: 15/139,390

(22) Filed: Apr. 27, 2016

(65) Prior Publication Data

US 2016/0376107 A1 Dec. 29, 2016

(30) Foreign Application Priority Data

Jun. 25, 2015 (CA) ..................................... 2895370

(51) Int. Cl.
*G01G 11/10* (2006.01)
*G01G 13/24* (2006.01)
(Continued)

(52) U.S. Cl.
CPC ............ *B65G 43/08* (2013.01); *B65G 15/00* (2013.01); *B65G 33/14* (2013.01); *B65G 47/19* (2013.01);
(Continued)

(58) Field of Classification Search
CPC ...... G01G 11/10; G01G 11/08; G01G 11/086; G01G 13/24; G01G 13/247; G01G 19/08; G01G 19/12; B65G 15/00; B65G 33/14; B65G 43/08; B65G 47/19; B65G 65/34; B65G 65/46; B65D 90/48; G05D 9/12
See application file for complete search history.

(56) References Cited

U.S. PATENT DOCUMENTS 1,992,716 A * 2/1935 Paxton ................... G01G 11/10
177/116
2,279,475 A * 4/1942 Merrick ............... G01G 11/025
177/109

(Continued)

FOREIGN PATENT DOCUMENTS

GB 2136754 9/1984
WO WO 2014/029493 2/2014

*Primary Examiner* — Randy Gibson
(74) *Attorney, Agent, or Firm* — Nixon & Vanderhye P.C.

(57) ABSTRACT

A conveyor capacity control system includes a conveyor operative to receive granular material at a conveyor intake thereof and convey same to a conveyor discharge with a conveying device at a conveyor flow rate up to a maximum conveyor flow rate, and a granular material container with a container discharge opening oriented to discharge granular material from the granular material container into the conveyor intake, and a discharge gate movable to control a size of the container discharge opening. A flow rate control processor is operative to determine the maximum conveyor flow rate and detect when a discharge flow rate of granular material from the container discharge opening into the conveyor intake is greater than or less than the maximum conveyor flow rate, and increase or decrease the discharge flow rate to substantially coincide with the maximum conveyor flow rate. A hoist control is also provided for a truck box.

31 Claims, 6 Drawing Sheets

(51) Int. Cl.
*G01G 19/12* (2006.01)
*B65G 15/00* (2006.01)
*B65G 43/08* (2006.01)
*B65G 33/14* (2006.01)
*B65G 47/19* (2006.01)
*B65G 65/46* (2006.01)
*G05D 9/12* (2006.01)
*B65D 90/48* (2006.01)
*G01G 11/08* (2006.01)
*B65G 65/34* (2006.01)

(52) U.S. Cl.
CPC .......... *B65G 65/34* (2013.01); *B65G 65/46* (2013.01); *G01G 11/083* (2013.01); *G01G 11/10* (2013.01); *G01G 13/24* (2013.01); *G01G 19/12* (2013.01); *B65D 90/48* (2013.01); *G05D 9/12* (2013.01)

(56) References Cited

U.S. PATENT DOCUMENTS

| | | | | |
|---|---|---|---|---|
| 2,343,722 A * | 3/1944 | Wagner | C04B 7/38 | 222/55 |
| 2,549,908 A * | 4/1951 | Johansen | G01G 11/12 | 118/663 |
| 2,637,434 A * | 5/1953 | Harper | G01G 11/083 | 177/121 |
| 2,662,665 A * | 12/1953 | Harper | G01G 11/083 | 198/577 |
| 3,362,585 A * | 1/1968 | Nessim | B01F 15/00194 | 198/530 |
| 3,679,010 A * | 7/1972 | Bullivant | B65G 47/00 | 177/1 |
| 3,773,220 A * | 11/1973 | Morgan | B65G 65/46 | 222/227 |
| 3,966,128 A * | 6/1976 | Anderson | A01F 29/005 | 241/101.761 |
| 4,378,897 A * | 4/1983 | Kattelmann | B65D 90/48 | 198/316.1 |
| 4,421,148 A * | 12/1983 | Knoll | B65G 47/19 | 141/392 |
| 4,574,849 A * | 3/1986 | Fukuda | G01F 11/28 | 141/1 |
| 4,580,698 A * | 4/1986 | Ladt | B65G 47/19 | 177/122 |
| 5,261,743 A * | 11/1993 | Moller | B29B 7/728 | 177/121 |
| 6,276,516 B1 | 8/2001 | Bagust et al. | | |
| 6,763,932 B2 * | 7/2004 | Stenson | B65G 15/08 | 198/550.5 |
| 7,063,497 B2 | 6/2006 | Mast et al. | | |
| 7,191,889 B1 | 3/2007 | Heley | | |
| 7,789,217 B2 * | 9/2010 | Fischer | B65G 69/181 | 198/525 |
| 7,946,416 B2 | 5/2011 | Grose et al. | | |
| 8,118,151 B1 | 2/2012 | Jesse | | |
| 8,365,896 B2 | 2/2013 | Jesse | | |
| 8,381,900 B1 * | 2/2013 | Hoogestraat | B65G 33/14 | 198/588 |
| 8,749,628 B2 * | 6/2014 | Wuestefeld | G01F 1/00 | 177/1 |
| 8,992,156 B2 | 3/2015 | Haukaas et al. | | |
| 2004/0136817 A1 | 7/2004 | Kirsch | | |
| 2007/0114240 A1 | 5/2007 | Schwass | | |
| 2014/0044507 A1 | 2/2014 | Naizer et al. | | |
| 2014/0158497 A1 | 6/2014 | Bogle | | |
| 2014/0190084 A1* | 7/2014 | Schlagel | B65D 88/54 | 49/31 |
| 2014/0343723 A1 | 11/2014 | Meier et al. | | |

* cited by examiner

OPERATING GRANULAR MATERIAL CONVEYORS NEAR CAPACITY

This application and claims priority to CA Serial No. 2,895,370 filed 25 Jun. 2015, the entire content of which is hereby incorporated by reference.

This disclosure relates to the field of conveyors for conveying granular material such as agricultural products, sand and gravel, and the like, and in particular operating granular material conveyors close to their maximum capacity.

BACKGROUND

It is generally desirable to operate a granular material conveyor as close to its maximum capacity as possible in order to reduce the time needed to make a transfer. For example in agricultural operations granular material conveyors, typically auger or belt conveyors, are commonly used to transfer agricultural products. At seeding time agricultural products are moved by conveyors from storage facilities to a transport vehicle and then from the transport vehicle to a seeding implement. Similarly at harvest time harvested crops such as grains, beans, etc. are moved by conveyors from harvesting equipment to transport vehicles, and from the transport vehicles to storage facilities.

Such agricultural operations are quite time sensitive since the time suitable for seeding and harvesting is limited by weather conditions. Generally speaking time spent loading and unloading transport vehicles with a conveyor is considered unproductive down time so it can be said that operating a granular material conveyor as near to capacity as possible is desirable to reduce this down time.

A typical conveyor used in the agricultural industry is disclosed for example in U.S. Pat. Nos. 8,118,151 and 8,365,896 to Jesse. The conveyor comprises a tube mounted on a frame and wheels for movement and for raising and lowering the discharge end of the conveyor. A belt or auger runs inside the tube. Conventional dump trucks for transporting agricultural products have a box mounted on the truck frame and a hoist operative to pivot the front end of the box upward about a horizontal pivot axis at the rear of the truck frame so the products in the box flow out through a discharge opening in the lower rear wall of the box, with the rate of product flow into the conveyor intake controlled by a gate that adjusts the size of the discharge opening. The truck is backed up to the lower intake end of the conveyor to align the discharge opening with the conveyor intake, and the hoist is raised.

Agricultural products are also often transported in hoppered trailers where the discharge opening is in the middle of the bottom of the trailer. Conveyors such as disclosed by of Jesse cannot be positioned to receive the product from such a belly dump discharge opening and so swing augers have been developed such as disclosed in U.S. Pat. No. 7,191,889 to Heley. Heley shows an auger conveyor but a similar configuration is known and used where the conveyor is a belt conveyor. The conveyor of Heley includes a main conveyor with a short swing conveyor pivotally attached at the discharge end thereof to the intake of the main conveyor. Once the trailer is in position the intake hopper on the outer end of the swing auger is moved under the discharge opening to receive the product, and a gate again is operated to control flow of product into the conveyor intake. A typical intake hopper has upward and outward sloping walls to receive the product and direct same to a conveyor auger or belt at the bottom of the walls.

U.S. Pat. No. 7,946,416 to Grose et al. discloses a swing auger where the swing auger moves in and out with respect to the intake of the main conveyor so the hopper of the swing auger can be moved close to the main conveyor intake to allow the trailer to drive into position, then the hopper can be moved away from the main intake under the discharge openings in the middle of the bottom of hoppered trailers.

U.S. Pat. No. 8,992,156 to Haukaas, et al. discloses a transfer conveyor mounted to a hoppered trailer to receive granular material from the center discharge opening and transfer same to a main conveyor intake beside the trailer. U.S. Pat. No. 7,063,497 to Mast et al. and United States Published Patent Application Number 20040136817 of Kirsch disclose a conveyor where the trailer is driven over the intake portion of the swing auger to align the trailer's discharge opening with the conveyor intake.

Once the discharge opening on the truck or trailer is aligned with the conveyor intake the gates on the discharge openings are operated manually with a crank or lever, or remotely where an actuator is present to move the gate to control the rate flow into the conveyor intake. In a typical operation the operator will visually monitor the conveyor intake and move the gate open or closed to ensure the rate of material flow is not greater than the rate of material transfer by the conveyor, such that the material builds up and overflows the hopper, but also so the rate of material flow is not significantly less than the rate of material transfer by the conveyor, thereby increasing the time that is required to empty the truck or trailer.

United States Published Patent Application Number 2014/0343723 of Meier et al. discloses a bin spill prevention system has a sensor on the discharge of a conveyor to sense when a storage bin is full and then closes a truck discharge gate that is directing material into the conveyor.

SUMMARY OF THE INVENTION

The present disclosure provides a conveyor apparatus that overcomes problems in the prior art.

In a first embodiment the present disclosure provides a conveyor capacity control system comprising a conveyor operative to receive granular material at a conveyor intake thereof and convey received granular material to a conveyor discharge thereof with a conveying device at a conveyor flow rate up to a maximum conveyor flow rate and a granular material container with a container discharge opening oriented to discharge granular material from the granular material container into the conveyor intake, and a discharge gate movable to open and close the container discharge opening and control a size of the container discharge opening. A flow rate control processor is operative to determine the maximum conveyor flow rate and detect when a discharge flow rate of granular material from the container discharge opening into the conveyor intake is greater than or less than the maximum conveyor flow rate, and operative to increase or decrease the discharge flow rate to substantially coincide with the maximum conveyor flow rate.

In a second embodiment the present disclosure provides a discharge system for a granular material box mounted on a truck frame with a hoist operative to pivot a front end of the box upward about a horizontal pivot axis at the rear of the truck frame so the products in the box flow out through a box discharge opening in the lower rear wall of the box. The system comprises a discharge gate movable to control the size of the discharge opening to increase or decrease a discharge flow rate of granular material from the box discharge opening and a granular material sensor mounted inside the box above the box discharge opening and operative to indicate to a hoist controller when granular material is below the granular material sensor. The hoist controller is operative activate the hoist to raise the front end of the box upward to maintain granular material above the flow material sensor as granular material flows out of the box through the box discharge opening.

In a third embodiment the present disclosure provides a method of controlling a conveyor for conveying granular material. The method comprises discharging granular material from a granular material container through a container discharge opening, and the granular material container comprising a discharge gate operative to control a size of the container discharge opening; orienting a conveyor intake of the conveyor to receive granular material from the container discharge opening and conveying received granular material to a conveyor discharge of the conveyor with a conveying device at a conveyor flow rate up to a maximum conveyor flow rate; and determining the maximum conveyor flow rate and detecting when a discharge flow rate of granular material from the container discharge opening into the conveyor intake is greater than or less than the maximum conveyor flow rate, and increasing or decreasing the discharge flow rate to substantially coincide with the maximum conveyor flow rate.

The present disclosure thus provides a system and method for operating conveyors at their practical maximum conveyor capacity using a variety of means including speed sensors, weighing systems, drive force sensors, and the like. Control of the hoist of a truck box to provide automatic lifting of the box as granular material is discharged is provided as well.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
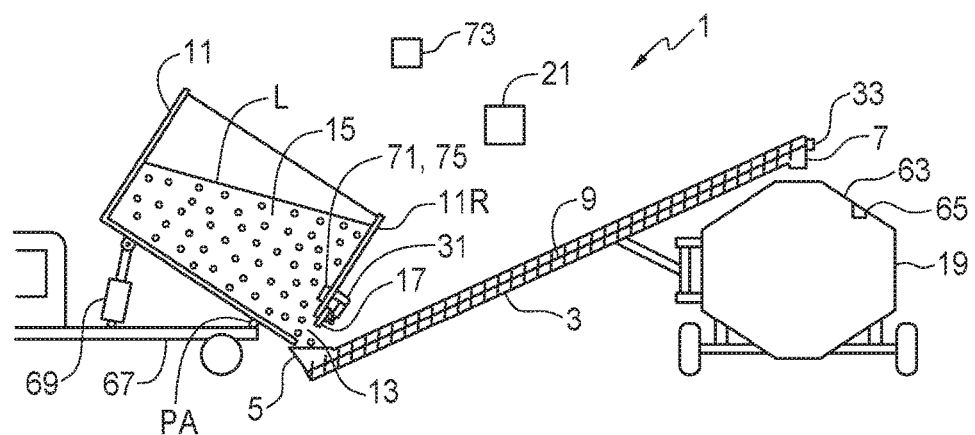
FIG. 1 is a schematic sectional side view of an embodiment of the conveyor capacity control system of the present disclosure.

FIG. 1 schematically illustrates an embodiment of a conveyor capacity control system 1 of the present disclosure. The system 1 comprises a conveyor 3 operative to receive granular material at a conveyor intake 5 thereof and convey received granular material to a conveyor discharge 7 thereof with a conveying device 9 at a conveyor flow rate up to a maximum conveyor flow rate. A granular material container 11, here illustrated as a truck box, has a container discharge opening 13 oriented to discharge granular material 15 from the container 11 into the conveyor intake 5, and a discharge gate 17 movable to open and close the container discharge opening 13 to control a size of the container discharge opening 13 and thus control the discharge flow rate of granular material 15 from the container 11. The system 1 of FIG. 1 schematically illustrates an agricultural application of the system 1 where the conveyor 3 is mounted on an air seeder cart 19 and the conveying device 9 is an auger, although such agricultural conveyors are also known to use a belt.

Although it is generally desirable to maximize the discharge flow rate to minimize the time spent conveying the granular material 15 from the granular material container 11, the conveyor 3 will be limited to a maximum conveyor flow rate, depending on the size of the conveying device, the power of the conveyor drive, and like limitations inherent in any conveyor, as well as the degree of vertical incline, the nature of the granular material, and like factors. As well, some practicality factor should be built into a determination of the maximum conveyor flow rate to account for things such as excessive motor loading, excessive belt loading, and such considerations. Thus the maximum conveyor flow rate, as the term is used herein, means that flow rate at which it is practical to run the conveyor continuously for the periods contemplated.

When the discharge flow rate is increased beyond the maximum conveyor flow rate to a point where the rate of granular material 15 entering the conveyor intake 5 exceeds the rate of granular material being discharged from the conveyor discharge 7 and so granular material 15 builds up in or on the conveyor 3 and the conveyor 3 will fill with granular material and stop or spill over the sides if the conveyor is open.

The present system thus provides a flow rate control processor 21 operative to determine the maximum conveyor flow rate and detect when the discharge flow rate of granular material 15 from the container discharge opening 13 into the conveyor intake 5 is greater than or less than the maximum conveyor flow rate, and operative to increase or decrease the discharge flow rate to substantially coincide with the maximum conveyor flow rate. As known in the art the flow rate control processor 21 can be provided by a handheld phone, pad, or the like communicating wirelessly with the various sensors required, or a hardwired microprocessor unit. The flow rate control processor 21 determines what the practical maximum conveyor flow rate actually is, and then adjusts the discharge flow rate to coincide.

Figure 2:
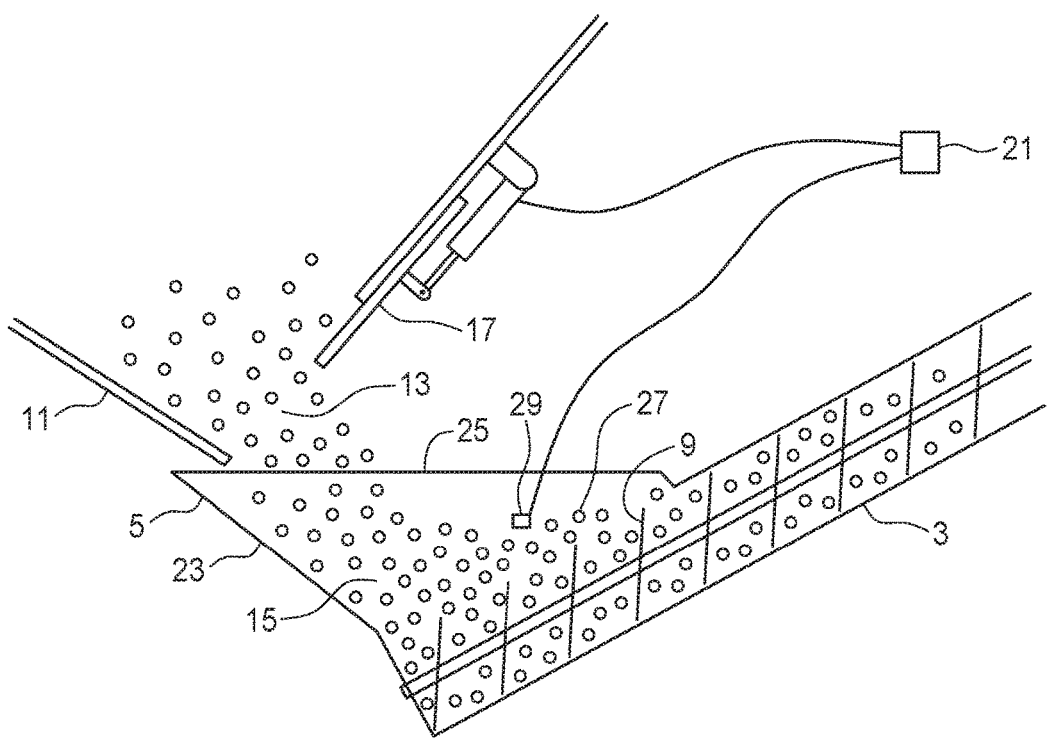
FIG. 2 is a schematic sectional side view of the conveyor intake and granular material container discharge opening of the embodiment of FIG. 1.

As schematically illustrated in FIG. 2, the conveyor intake 5 comprises a hopper 23 with sloping hopper walls 25 configured to receive the granular material 15 from the container discharge opening 13 and direct same to an exposed portion of the auger conveying device 9. In such arrangements it is known that when the discharge flow rate of granular material out of the discharge opening 13 is greater than the maximum conveyor flow rate, a pile 27 of granular material 15 builds up above the exposed portion of the auger conveying device 9. The flow rate control processor is operative to monitor a height of the pile 27 and increase or decrease the discharge flow rate to maintain the pile 27 at a substantially constant height. FIG. 2 schematically illustrated a material sensor 29 on an inside of the hopper wall 25 which is connected to the flow rate control processor 21 to monitor the height of the pile 27 above the exposed auger in the bottom of the hopper 23.

Also illustrated in FIG. 2 is a gate actuator 31 operative to move the discharge gate 17. The flow rate control processor 21 is operative to activate the gate actuator 31 to control the size of the container discharge opening 13 to increase or decrease the discharge flow rate.

Figure 3:
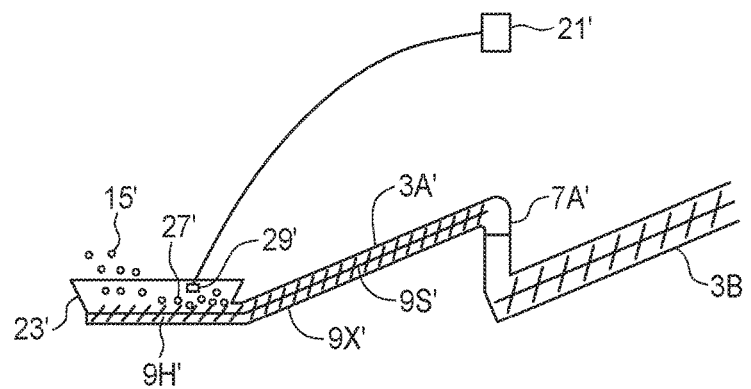
FIG. 3 is a schematic sectional side view of an alternate embodiment of the conveyor capacity control system of the present disclosure where the conveyor is a swing away auger conveyor.

FIG. 3 schematically illustrates a conveyor 3' comprising a transfer auger 3A' with a transfer discharge 7A' thereof connected to a main intake 5A' of a main auger 3B. The conveyor intake hopper 23' is oriented substantially horizontally and the transfer auger 3A' comprises a horizontal auger section 9H' extending along a bottom of the hopper 23' and a sloping auger section 9S' extending through an auger tube 9X'. When the discharge flow rate of granular material into the hopper 23' is greater than the maximum conveyor flow rate, a pile 27' of granular material 15' builds up above the exposed portion of the horizontal auger section 9H' and again a material sensor 29' communicates the height of the pile 27' to the flow rate control processor 21'.

The system 1 may also comprise a conveyor speed sensor 33 operative to determine a conveyor speed of the conveying device 9. Instead of sensing the pile 27, the maximum conveyor flow rate can be determined by calibrating the conveyor 3 to determine an optimum conveyor speed that provides the maximum conveyor flow rate and the flow rate control processor 21 is then operative to increase or decrease the discharge flow rate to maintain the conveyor speed at the optimum conveyor speed determined by the calibration.

Figure 4:
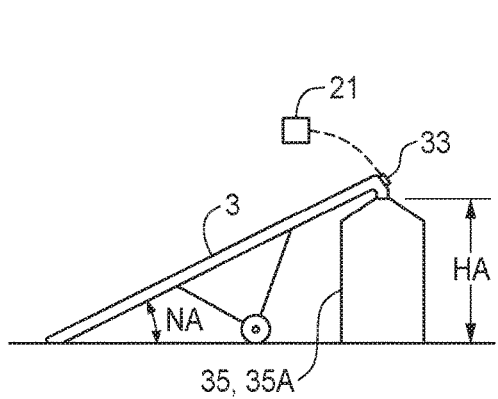
FIG. 4 is a schematic side view of the conveyor of the embodiment of FIG. 1 oriented to discharge granular material into a first bin.
Figure 5:
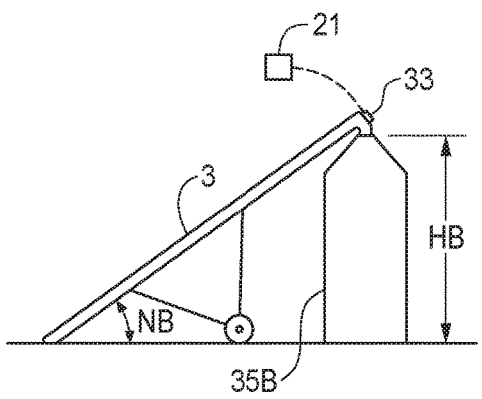
FIG. 5 is a schematic side view of the conveyor of the embodiment of FIG. 1 oriented to discharge granular material into a second bin that is higher than the first bin of FIG. 4.

The calibration is typically done by weighing granular material as it goes into the conveyor intake 5 or as it is discharged from the conveyor discharge 7, and timing the period required to transfer a known weight of granular material. In an agricultural application for example grain is typically transferred from trucks into bins, and the bins may be of differing heights. FIGS. 4 and 5 schematically illustrated a system 1 for use in conveying granular material into a first bin 35A with a first height HA and a second bin 35B with a second height HB greater than the first height HA, such that the conveyor 3 slopes upward at a first angle NA to discharge into the first bin 35A and slopes upward at a greater second angle NB to discharge into the second bin 35B.

A first maximum conveyor flow rate is determined by calibrating the conveyor 3 to determine an optimum first conveyor speed with speed sensor 33 for discharging into the first bin 35A, and a second maximum conveyor flow rate is determined by calibrating the conveyor 3 to determine an optimum second conveyor speed with speed sensor 33 for discharging into the second bin 35B. The flow rate control processor 21 is operative to increase or decrease the discharge flow rate to maintain the conveyor speed at the optimum first or second conveyor speed corresponding to whether the conveyor 3 is discharging into the first or second bin. Once calibrated for the various sizes of bins 35 on a farm, the flow rate control processor can be programmed with the optimum speed for any particular bin where the conveyor is being used. Calibration may also be required for different granular materials that may be conveyed.

Figure 6:
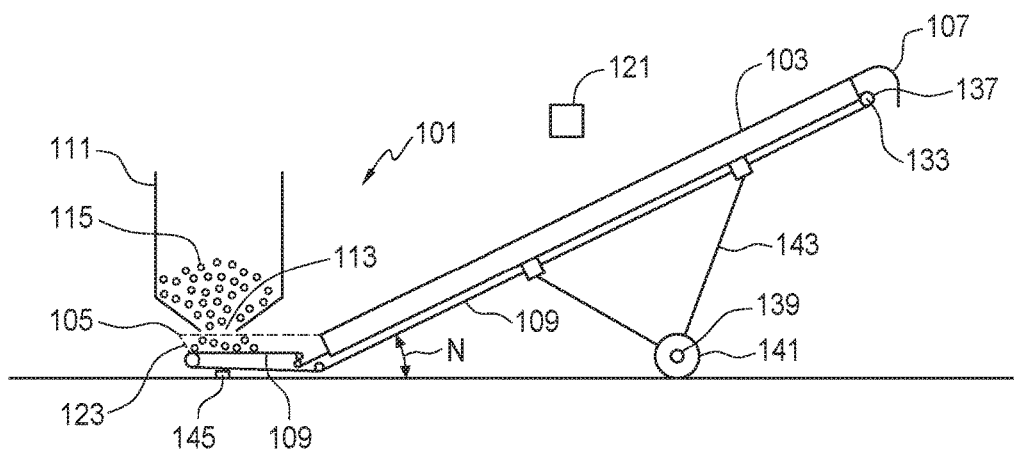
FIG. 6 is a schematic sectional side view of an alternate embodiment of the conveyor capacity control system of the present disclosure where the conveyor includes a transfer conveyor section extending under the granular material container to receive granular material from a horizontal discharge opening in the middle bottom of the granular material container, and a main conveyor section extending upward from the discharge end of the transfer conveyor section.

FIG. 6 schematically illustrates a conveyor 103 where the conveying device is a belt conveying device 109. The conveyor capacity control system 101 of the present disclosure comprising a conveyor speed sensor 133, here provided on the top roller 137 of the belt conveying device 109, operative to determine a conveyor speed of the belt conveying device 109, and a weighing system, here provided by load cells 139 on the wheels 141 of the conveyor frame 143, operative to determine a conveyor weight of at least a weighed portion of the conveyor 103.

The illustrated load cells 137 sense the weight of the weighed portion of the conveyor 103 being that weight that is carried on the wheels 141. The portion of the total conveyor weight carried by the wheels 141 relative to the weight carried by the lower end of the conveyor 103 resting on the ground will remain substantially constant as the amount of granular material on the conveyor varies. Thus for example if 80% of the weight is carried on the wheels 141 when the conveyor is empty, then 80% of the weight is carried on the wheels 141 when the conveyor is conveying a flow rate of granular material.

Generally speaking the conveyor speed decreases as a material weight of granular material 115 on the conveyor increases, and the flow rate control processor 121 is operative to determine the conveyor flow rate and increase or decrease the discharge flow rate to provide the maximum conveyor flow rate.

The flow rate control processor 121 is operative to determine an empty weight of the weighed portion of the conveyor 103 when the discharge flow rate is zero, and then increase the discharge flow rate to a first test discharge flow rate. The flow rate control processor 121 then monitors the weight of the weighed portion of the conveyor 103 as granular material 15 is conveyed from the conveyor intake 105 to the conveyor discharge 107, and determines when the conveyor 103 is fully loaded by determining when the weight of the weighed portion of the conveyor 103 is substantially stable. The flow rate control processor 121 then determines the weight of granular material 115 on the weighed portion of the conveyor 103 by subtracting the empty weight, and determines the conveyor flow rate from the weight of granular material on the weighed portion of the conveyor 103 and the conveyor speed of the belt conveying device 109.

The flow rate control processor 121 then increases the test discharge flow rate and achieves a stable conveyor weight in steps until a final step following after an optimum step results in an excessive discharge flow rate where the conveyor flow rate begins to decrease.

For example at the optimum step the weight of granular material on the weighed portion of the conveyor may be 70 kilograms (kg) with the belt speed at 7 meters/second (m/s) for a nominal conveyor flow rate of 490 kg-m/s, and at the final step the weight of granular material on the weighed portion of the conveyor increase to 80 kg but the belt speed drops to 6 m/s for a nominal conveyor flow rate of only 480 kg-m/s. The flow rate control processor 121 will then decrease the discharge flow rate.

The discharge flow rate could simply be reduced back to the discharge flow rate at the optimum step however there is a risk that, once the conveyor speed has begun to drop to the extent that the conveyor flow rate drops, the belt speed may continue to drop and the conveyor 103 may plug. To avoid that risk the flow rate control processor 121 can be operative, when the final step is reached, to reduce the discharge flow rate by a plurality of steps to a relief discharge flow rate that is considerably below the discharge flow rate that corresponds to the maximum conveyor flow rate in order to reduce the load on the conveyor 103 and allow the conveyor to discharge excessive granular material. When the weight of the weighed portion of the conveyor 103 has stabilized at a reduced weight corresponding to the relief discharge flow rate, indicating that the excess granular material has been discharged, the flow rate control processor 121 can then increase the discharge flow rate to that of the optimum step.

During the process the flow rate control processor 121 can also determine a loading time, the loading time being the time between increasing the discharge flow rate to the first test discharge flow rate and the weight of the weighed portion of the conveyor becoming substantially stable, and the flow rate control processor 121 can provides a step time period between the steps of increasing the discharge flow rate that is greater than the loading time. In addition to achieving a stable conveyor weight, the step time period further ensures an appropriate time between steps.

A load cell 139 could also be provided on the lower end of the conveyor 103 to accurately obtain a total weight of the conveyor 103 however for most purposes once the proportions of conveyor weight carried by the wheels 141 is determined, such as by weighing the lower end of the conveyor 103, the proportion will remain reasonably constant so long as the angle of incline N of the conveyor 103 remains the same. And as set out in the numeric example above it is only the relative weight that is required to find a nominal conveyor rate. Where it is desired, the flow rate control processor 121 can also calculate an approximate conveyed weight of granular material conveyed in a selected period using a length of the conveyor and a proportion of the weighed portion of the conveyor to a total weight of the conveyor.

Thus using the numeric example above where the conveyor is 20 meters long, at the optimum step the actual conveyor flow rate will be 490 kg-m/s divided by 20 m equals 24.5 kg/s. Thus in one minute the conveyor 103 conveys 60×24.5=1470 kg. In a belt conveyor 103 such as illustrated, there will be some rollback of granular material down the belt conveying device 109 which will increase as the angle of incline N increases. Thus all the granular material on the belt 109 is not in fact moving from the intake 105 toward the discharge 107, and so the measurement of total weight conveyed will be only approximate. Rollback, and thus total weight inaccuracies, will increase as the angle of incline increases.

Similarly in a conveyor where the conveying device is an auger, there is some slippage down the incline resulting a counter-flow down the incline against the main flow up the incline, again increasing as the angle of incline increases, and so again the calculated total weight transferred is only approximate but can be useful for some purposes, especially if some calibration is carried out to determine the extent of the counter-flow or rollback.

Figure 7:
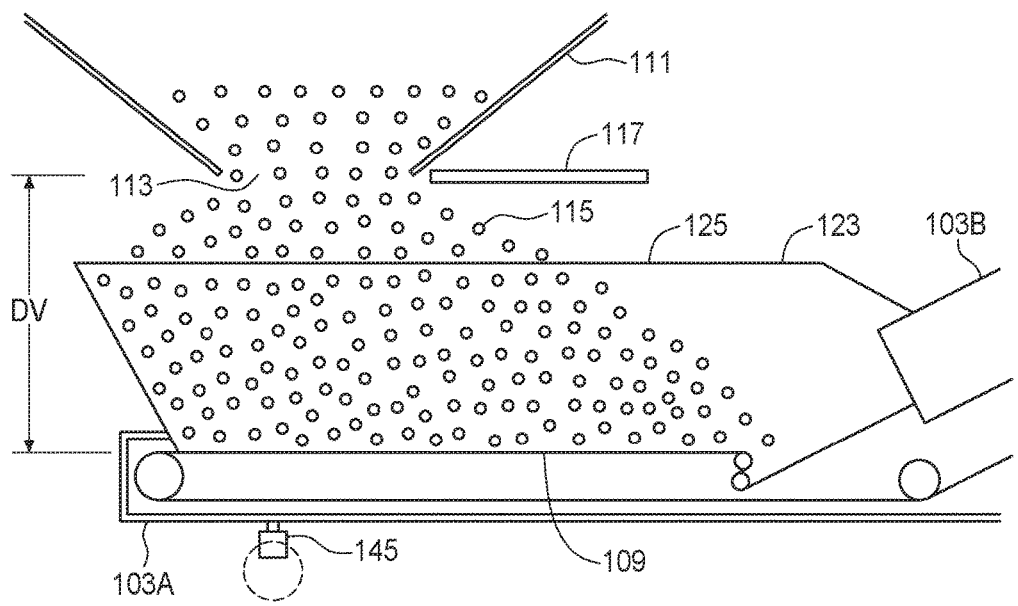
FIG. 7 is a schematic sectional side view of the conveyor intake and granular material container discharge opening of the embodiment of FIG. 6.

As illustrated in more detail in FIG. 7, in the system 101 the container discharge opening 113 is oriented substantially horizontally and the conveyor intake 105 comprises a hopper 123 with sloping hopper walls 125 configured to receive granular material from the container discharge opening 113 and direct same to an exposed portion of the belt conveying device 109 running along the bottom of the hopper 123. The hopper walls 125 are oriented with respect to the container discharge opening 113 such that when the container discharge opening 113 is fully open, granular material 115 flowing from the container discharge opening 113 is contained in the hopper 123. Since the granular material 115 can then only leave the container 111 as fast as the belt conveying device 109 takes it away, the discharge flow rate necessarily is equal to the conveyor flow rate.

The flow rate control processor 121 is operative to increase or decrease a vertical distance DV between the container discharge opening 113 and the exposed portion of the belt conveying device 109 to correspondingly increase or decrease the discharge flow rate to provide the maximum conveyor flow rate. It can be seen that when the vertical distance DV is increased the size of the effective opening through which granular material 115 can flow is increased and when the vertical distance DV is decreased the size of the effective opening through which granular material 115 can flow is decreased. The transfer conveyor section 103A is movable such that the conveyor intake 105 can move up and down with respect to the main conveyor section 103B from a lowered position to a raised position. The flow rate control processor 121 is operative to raise the conveyor intake 105 to decrease the discharge flow rate and lower the conveyor intake 105 to increase the discharge flow rate, and the flow rate control processor 121 is operative to stop the conveying device 109 to reduce the discharge flow rate to zero. The flow rate control processor 121 can raise and lower the conveyor intake 105 to increase or decrease the vertical distance DV by activating an extendable actuator 145 or by some like mechanism.

In the system 101, the container discharge opening 113 is in a middle bottom portion of the granular material container 111 and oriented substantially horizontally such as would be the case where the granular material container is a hoppered compartment on a trailer. The system 101 is advantageous as the gate 117 can simply be opened wide same does not require any modification of the trailer, such as providing an actuator to open or close the gate 117 to control the discharge flow rate. Thus any hoppered trailer can be emptied using the system 101.

To easily accommodate receiving granular material from such trailers the illustrated conveyor 103 comprises a transfer conveyor section 103A and a main conveyor section 103B. The transfer conveyor section 103A is configured to extend under the granular material container 111 and receive granular material 115 from the horizontal container discharge opening 115 at the conveyor intake 105 provided by the hopper 123. The main conveyor section 103B slopes upward from an inner end of the transfer conveyor section 103B and is operative to convey the received granular material to the conveyor discharge 107 at the conveyor flow rate.

Figure 8:
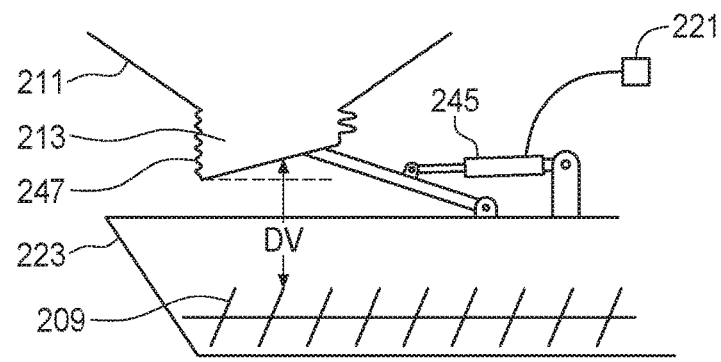
FIG. 8 is a schematic sectional side view of an alternate embodiment of the conveyor capacity control system of the present disclosure where the discharge opening includes a flexible chute attached to the bottom of a horizontal center discharge opening.

An economical modification to the container discharge opening 213 of a hoppered trailer is schematically illustrated in FIG. 8. The container discharge opening 213 comprises a flexible chute 247 with a top end attached to a bottom of the granular material container 211 and extending downward from the container 211 to a bottom end above the exposed portion of the conveying device, here shown as an auger conveying device 209, in the bottom of the hopper 223. The flow rate control processor 221 is operative to raise the bottom end of the flexible chute 247 to increase the discharge flow rate and lower the bottom end of the flexible chute 247 to decrease the discharge flow rate.

Again when the vertical distance DV is increased the size of the effective opening through which granular material can flow is increased and when the vertical distance DV is decreased the size of the effective opening through which granular material can flow is decreased. The flow rate control processor 221 is operative to stop the conveying device to reduce the discharge flow rate to zero. The flow rate control processor 221 can raise and lower the bottom end of the flexible chute 247 by activating an extendable actuator 245 or by some like mechanism. For convenience the illustrated actuator 245 lifts only one side of the flexible chute 247 which suffices for the purpose of increasing or decreasing the size of the effective opening.

Figure 9:
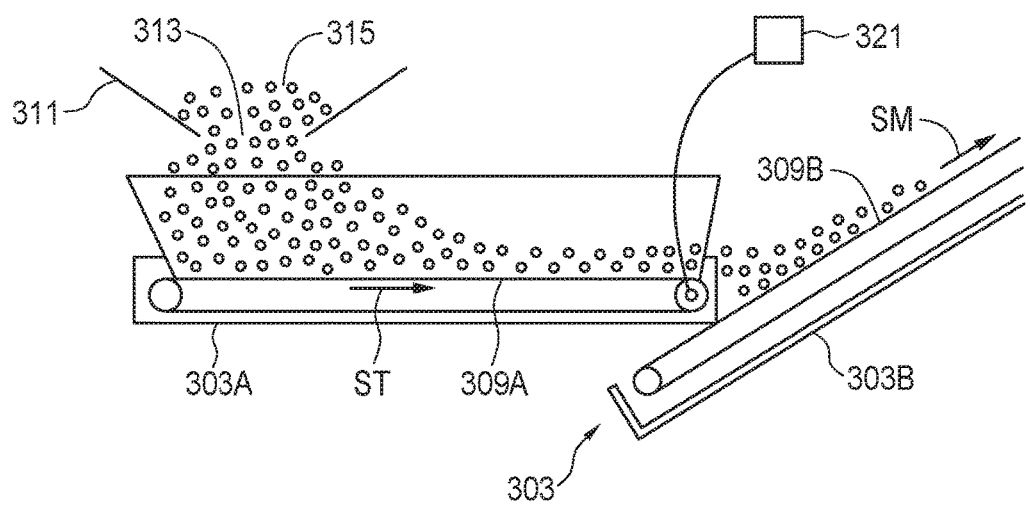
FIG. 9 is a schematic sectional side view of an alternate embodiment of the conveyor capacity control system of the present disclosure where the conveyor includes a transfer conveyor section with a transfer belt extending under the granular material container to receive granular material from a horizontal discharge opening in the middle bottom of the granular material container, and a main conveyor section with a main belt independent of the transfer belt extending upward from the discharge end of the transfer conveyor section.

FIG. 9 schematically illustrates a conveyor 303 where the conveying device is a belt conveying device 309 and the transfer conveyor section 303A comprises a transfer belt 309A moving at a transfer belt speed ST and the main conveyor section 303B comprises a main belt 309B moving at a main belt speed SM. The hopper walls 325 are oriented with respect to the container discharge opening 313 such that when the container discharge opening 313 is fully open, granular material 315 flowing from the container discharge opening 313 is contained in the hopper 323.

The granular material 315 can again only leave the container 311 as fast as the belt conveying device 309A takes it away, but here the vertical position of the transfer conveyor section 303A remains constant and the discharge flow rate is dependent on the speed of the transfer belt 309A, which is independent of the speed of the main belt 309B. The flow rate control processor 321 is operative to increase or decrease the transfer belt speed ST to increase or decrease the discharge flow rate to substantially coincide with the maximum conveyor flow rate, and stops the transfer belt 309A to reduce the discharge flow rate to zero. The main conveyor speed SM may vary depending on the load as described above, but is not controlled directly by the flow rate control processor 321.

Any conveyor will include a conveyor drive operative to provide power to move the conveying device. A drive force sensor can be provided and calibrated to indicate when the drive force is at a level where the conveyor flow rate is at the maximum level, and then the flow rate control processor is operative to increase or decrease the discharge flow rate to maintain the drive force at a level selected to provide the maximum conveyor flow rate.

Figure 10:
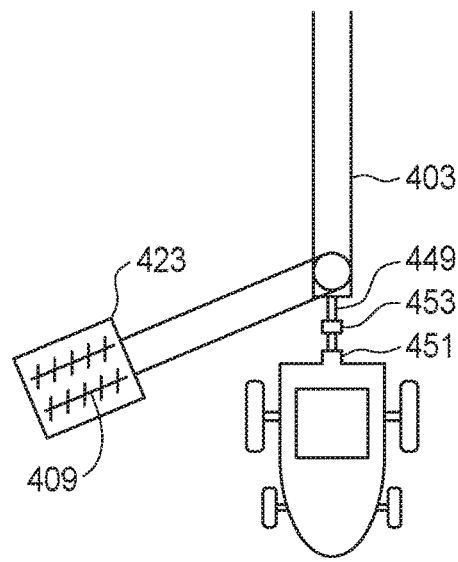
FIG. 10 is a top view of the embodiment of FIG. 3 being driven by a tractor power take-off and with a torque sensor.

Both auger and belt conveyors are commonly driven by connection to the power take-off of a tractor. FIG. 10 schematically illustrates a swing away auger conveyor 403 where the conveyor drive comprises a power take-off shaft 449 connected to a tractor power take-off 451, and wherein the drive force sensor is a torque sensor 453 operative to determine the torque exerted on the power take-off shaft 449 by the tractor power take-off 451. In such an auger conveyor 403, the operator can visually monitor the pile of granular material above the exposed auger conveying device 409 in the hopper 423 as described above and select the torque level that corresponds to a pile height that yields the maximum conveyor flow rate as described above, for example with respect to FIGS. 1 and 2.

Such augers will generally have a maximum power rating set by the manufacturer and the torque level can be selected to correspond to that maximum power rating, using the corresponding power take-off speed of 540 or 1000 revolutions per minute (rpm).

Figure 11:
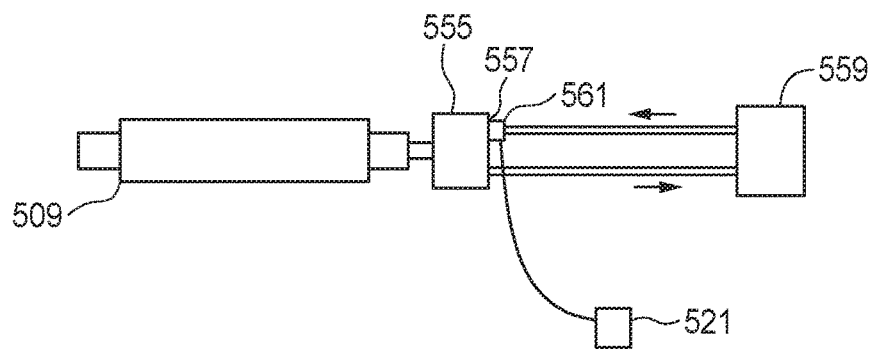
FIG. 11 is an end view of a belt conveyor such as shown in the embodiments of FIGS. 6 and 9 showing the roller of the belt conveying device driven by a hydraulic motor.

Both auger and belt conveyors are also commonly driven by a hydraulic motor connected to a source of pressurized hydraulic fluid. FIG. 11 schematically illustrates a conveyor where the conveying device is a belt conveying device 509 driven by a hydraulic motor 555 with an input port 557 thereof connected to a pressurized hydraulic fluid source 559 and a pressure sensor 561 operative to sense a hydraulic fluid pressure at the input port 557. As the hydraulic pressure at the input port 557 increases, the force exerted by the hydraulic motor 555 increases correspondingly.

The pressurized hydraulic fluid source 559, such as a tractor hydraulic system, provides hydraulic fluid at pressures up to a maximum pressure, for example 2800 pounds per square inch (psi), and maximum torque is provided at the maximum pressure. The flow rate control processor 521 is operative to increase or decrease the discharge flow rate to maintain a selected hydraulic fluid pressure at the input port 557 that is somewhat less than the maxim pressure available, such as for example 2600 psi.

The conveyor discharge 7 is typically oriented to discharge granular material into a vessel 63. As schematically illustrated in FIG. 1 the vessel 63 is illustrated as a tank on the air seeder cart 19, and comprising a fill indicator 65 connected to the flow rate control processor 21 which is operative to reduce the discharge flow rate to zero when the fill indicator 65 indicates that a desired amount of granular material has been discharged into the vessel 63. Depending on the particular mechanism used to reduce the discharge flow rate to zero, such as when the transfer conveyor of FIG. 9 is stopped to reduce the discharge flow rate to zero, the operator may be required to manually close the container discharge opening and then manually start the conveyor to transfer all the granular material out of the conveyor. The fill indicator 65 will be positioned to allow for this if required.

The present disclosure also provides a discharge system for the granular material container comprising the box 11 of FIG. 1. The box 11 is mounted on the truck frame 67 with a hoist 69 operative to pivot the front end of the box upward about a horizontal pivot axis PA at the rear of the truck frame 67 so the products in the box 11 flow out through the box discharge opening 13 in the lower rear wall of the box 11. When the box 11 is full of granular material 15 the box 11 may be tilted up only partially to prevent the granular material from flowing over the top of the rear wall 11R. As granular material 15 flows out of the box 11, the level L of granular material 15 drops and the hoist must be activated periodically to maintain the level L of granular material above the discharge opening 13.

The present system thus comprises the discharge gate 17 movable to control the size of the discharge opening 13 to increase or decrease a discharge flow rate of granular material from the box discharge opening 13, a granular material sensor 71 mounted inside the box 11 above the box discharge opening 13 and operative to indicate to a hoist controller 73 when granular material 15 is below the granular material sensor and the hoist controller 73 is operative activate the hoist 69 to raise the front end of the box 11 upward to maintain granular material above the flow material sensor 71 as granular material flows out of the box 11 through the box discharge opening 13. Thus an operator can set the gate 17 at a position where the discharge flow rate is somewhat less than the observed maximum conveyor flow rate and then attend to other matters instead of having to stay and watch the discharge process and operate the hoist 69 as required.

Figure 12:
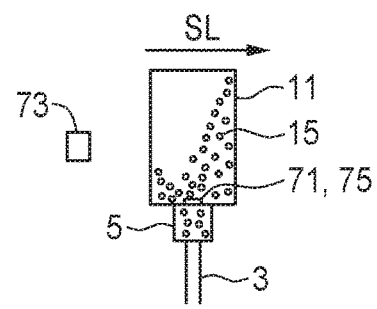
FIG. 12 is a schematic top view of the truck box and conveyor of the embodiment of FIG. 1 when the truck box is on a sloping ground surface.

Care must be taken with such tilting truck boxes where the process is taking place on sloping ground, such as schematically illustrated in the top view of FIG. 12 where the truck is parked on ground that slopes downward in direction SL. As the box moves up the granular material will tend to flow to the low side, causing the configuration of granular material 15 where considerably more granular material is on the low side of the box 11 than is on the high side. This condition can cause the box 11 to twist damaging the mechanism of the hoist 69 and the frame 67 or in extreme cases the box 11 may tip over towards the low side. To avoid this risk the system includes a tilt sensor 75 mounted on the box and operative to indicate to the hoist controller 73 that the box 11 is tilted to the right or left beyond a selected safe degree of tilt. The hoist controller 73 is operative to prevent the hoist 69 from raising the front end of the box 11 when the box 11 is tilted beyond the safe degree of tilt.

In the system schematically illustrated in FIG. 1 the conveyor 3 is operative to receive granular material 15 discharged through the box discharge opening 13 at the conveyor intake 5 thereof, and the gate actuator 31 is operative to move the discharge gate to control the discharge flow rate, and the flow rate control processor is operative to increase or decrease the discharge flow rate to substantially coincide with the maximum conveyor flow rate. The hoist controller 73 maintains the level L of the granular material above the discharge opening 13, and the hoist controller can be incorporated into the flow rate control processor 21.

Figure 13:
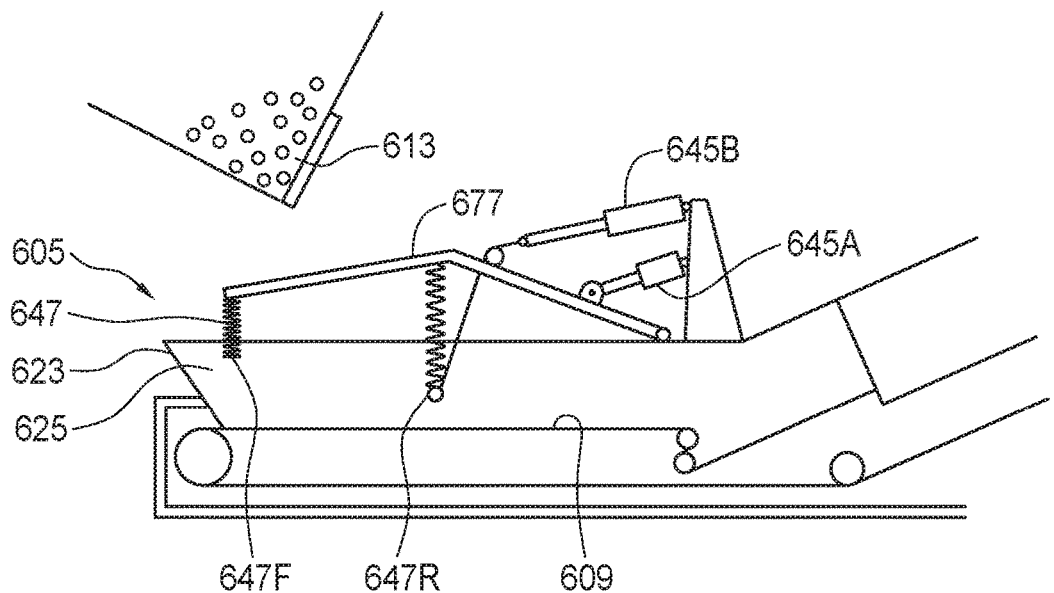
FIG. 13 is a schematic sectional side view of an alternate embodiment of the conveyor capacity control system of the present disclosure with a flexible chute attached to the conveyor intake, where the chute is in a lowered idle position.
Figure 14:
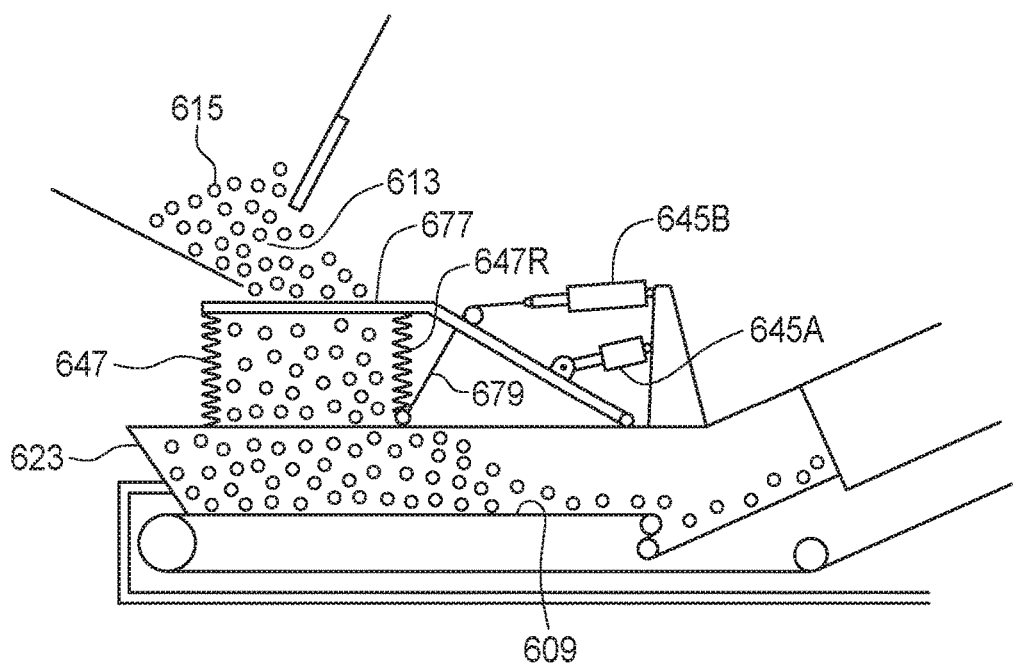
FIG. 14 is a schematic sectional side view of the embodiment of FIG. 13 where the chute is in a raised operating position.

FIGS. 13 and 14 schematically illustrate a flexible chute 647 that is attached to the hopper 623 of the conveyor intake 605 instead of being attached to the granular material container as shown in FIG. 8. The hopper 623 has sloping hopper walls 625 and the flexible chute 647 is attached to the hopper walls 625. The bottom of the chute 647 is attached to the hopper walls 625 at a front end 647F thereof and the bottom rear end 647R of the chute hangs in in the hopper 623. The top of the chute 647 is attached to a chute frame 677 and a chute top actuator 645A is operative to move the chute frame 677 and the top end of the flexible chute 647 from a lowered idle position shown in FIG. 13 to a raised operating position shown in FIG. 14. The conveyor intake 605 is shown in position to receive granular material 615 from the discharge opening 613 of a granular material container 611 that is a truck box as shown in FIG. 1. It is contemplated that the conveyor intake 605 could also be used on a granular material container with a horizontal center discharge opening such as shown in FIG. 6 for example.

When the flexible chute 647 is in the operating position, the flexible chute 647 and hopper 623 are configured to receive granular material 615 from the container discharge opening 613 and direct same to an exposed portion of the conveying device, shown as a belt conveying device 609. The chute 647 and hopper walls 625 are oriented with respect to the container discharge opening 613 such that when the container discharge opening 613 is fully open, granular material 615 flowing from the container discharge opening 613 is contained in the chute 647 and the hopper 623 and the discharge flow rate is equal to the conveyor flow rate. A chute bottom actuator 645B is operative to pull a tether 679 to raise and lower a bottom end of the flexible chute 647 to correspondingly increase and decrease the vertical distance between the bottom of the chute 747 and the belt conveying device 609, and correspondingly increase and decrease the discharge flow rate. The present disclosure also provides a method of controlling a conveyor 3 for conveying granular material, the method comprising discharging granular material 15 from a granular material container 11 through a container discharge opening 13, the granular material container 11 comprising a discharge gate 17 operative to control a size of the container discharge opening 13; orienting a conveyor intake 5 of the conveyor 3 to receive granular material 15 from the container discharge opening 13 and conveying received granular material 15 to a conveyor discharge 7 of the conveyor 3 with a conveying device 9 at a conveyor flow rate up to a maximum conveyor flow rate; detecting when a discharge flow rate of granular material 15 from the container discharge opening 13 into the conveyor intake 5 is greater than or less than the maximum conveyor flow rate, and increasing or decreasing the discharge flow rate to substantially coincide with the maximum conveyor flow rate.

The method may comprise determining a conveyor speed of the conveying device 9, and determining the maximum conveyor flow rate by calibrating the conveyor 3 to determine an optimum conveyor speed that provides the maximum conveyor flow rate and increasing or decreasing the discharge flow rate to maintain the conveyor speed at the optimum conveyor speed.

Where the conveyor speed decreases as a material weight of granular material 15 on the conveyor 3 increases the method may comprise determining a conveyor speed of the conveying device, and a conveyor weight of the conveyor 3, and determining the conveyor flow rate and increasing or decreasing the discharge flow rate to provide the maximum conveyor flow rate. The method may comprise determining an empty weight of the conveyor 3 when the discharge flow rate is zero; increasing the discharge flow rate to a first test discharge flow rate, and monitoring the weight of the conveyor 3 as granular material 15 is conveyed from the conveyor intake 5 to the conveyor discharge 7; determining when the conveyor 3 is fully loaded by determining when the weight of the conveyor 3 is substantially stable; determining the weight of granular material 15 on the conveyor; determining the conveyor flow rate from the weight of granular material 15 on the conveyor 3, a length of the conveyor 3, and the conveyor speed of the conveying device 9; increasing the test discharge flow rate in steps until a final step following after an optimum step results in an excessive discharge flow rate where the conveyor flow rate begins to decrease; and decreasing the discharge flow rate.

The method may comprise, when the final step is reached, reducing the discharge flow rate by a plurality of steps to a relief discharge flow rate, and when the weight of the conveyor 3 has stabilized, increasing the discharge flow rate to the optimum step.

The method may comprise determining a conveyed weight of granular material conveyed in a selected period.

The method may comprise driving the conveyor 3 with a conveyor drive and sensing a drive force exerted by the conveyor drive, and increasing or decreasing the discharge flow rate to maintain the drive force at a level selected to provide the maximum conveyor flow rate.

The present disclosure thus provides a system and method for operating conveyors at their practical maximum conveyor capacity. Control of the hoist of a truck box is provided as well.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A conveyor capacity control system comprising:
   a conveyor operative to receive granular material at a conveyor intake thereof and convey received granular material to a conveyor discharge thereof with a conveying device at a conveyor flow rate up to a maximum conveyor flow rate;
   a granular material container with a container discharge opening oriented to discharge granular material from the granular material container into the conveyor intake, and a discharge gate movable to open and close the container discharge opening and control a size of the container discharge opening;
   a flow rate control processor operative to determine the maximum conveyor flow rate and detect when a discharge flow rate of granular material from the container discharge opening into the conveyor intake is greater than or less than the maximum conveyor flow rate, and operative to increase or decrease the discharge flow rate to substantially coincide with the maximum conveyor flow rate;
   wherein the conveying device is an auger and the conveyor intake comprises a hopper with sloping hopper walls configured to receive the granular material from the container discharge opening and direct same to an exposed portion of the auger, and wherein when the discharge flow rate is greater than the maximum conveyor flow rate, a pile of granular material builds up above the exposed portion of the auger, and wherein the flow rate control processor is operative to monitor a height of the pile and increase or decrease the discharge flow rate to maintain the pile at a substantially constant height.

2. The system of claim 1 wherein the conveyor comprises a transfer auger with a transfer discharge thereof connected to a main intake of a main auger, and wherein the hopper is oriented substantially horizontally and the transfer auger comprises a horizontal auger section extending along a bottom of the hopper and a sloping auger section extending through an auger tube, and wherein the pile is formed above the horizontal section.

3. The system of claim 1 wherein the flow rate control processor comprises a conveyor speed sensor operative to determine a conveyor speed of the conveying device, and wherein the maximum conveyor flow rate is determined by calibrating the conveyor to determine an optimum conveyor speed that provides the maximum conveyor flow rate and the flow rate control processor is operative to increase or decrease the discharge flow rate to maintain the conveyor speed at the optimum conveyor speed.

4. A conveyor capacity control system comprising:
   a conveyor operative to receive granular material at a conveyor intake thereof and convey received granular material to a conveyor discharge thereof with a conveying device at a conveyor flow rate up to a maximum conveyor flow rate;
   a granular material container with a container discharge opening oriented to discharge granular material from the granular material container into the conveyor intake, and a discharge gate movable to open and close the container discharge opening and control a size of the container discharge opening;
   a flow rate control processor operative to determine the maximum conveyor flow rate and detect when a discharge flow rate of granular material from the container discharge opening into the conveyor intake is greater than or less than the maximum conveyor flow rate, and operative to increase or decrease the discharge flow rate to substantially coincide with the maximum conveyor flow rate;
   wherein the flow rate control processor comprises a conveyor speed sensor operative to determine a conveyor speed of the conveying device, and wherein the maximum conveyor flow rate is determined by calibrating the conveyor to determine an optimum conveyor speed that provides the maximum conveyor flow rate and the flow rate control processor is operative to increase or decrease the discharge flow rate to maintain the conveyor speed at the optimum conveyor speed;
   wherein the conveyor is configured to convey granular material into a first bin with a first height and a second bin with a second height greater than the first height, such that the conveyor slopes upward at a first angle to discharge into the first bin and slopes upward at a second angle to discharge into the second bin, and wherein a first maximum conveyor flow rate is determined by calibrating the conveyor to determine an optimum first conveyor speed for discharging into the first bin, and a second maximum conveyor flow rate is determined by calibrating the conveyor to determine an optimum second conveyor speed for discharging into the second bin, and the flow rate control processor is operative to increase or decrease the discharge flow rate to maintain the conveyor speed at the optimum first or second conveyor speed corresponding to the conveyor discharging into the first or second bin.

5. The system of claim 4 wherein the conveying device is one of an auger and a belt.

6. A conveyor capacity control system comprising:
   a conveyor operative to receive granular material at a conveyor intake thereof and convey received granular material to a conveyor discharge thereof with a conveying device at a conveyor flow rate up to a maximum conveyor flow rate;
   a granular material container with a container discharge opening oriented to discharge granular material from the granular material container into the conveyor intake, and a discharge gate movable to open and close the container discharge opening and control a size of the container discharge opening;

a flow rate control processor operative to determine the maximum conveyor flow rate and detect when a discharge flow rate of granular material from the container discharge opening into the conveyor intake is greater than or less than the maximum conveyor flow rate, and operative to increase or decrease the discharge flow rate to substantially coincide with the maximum conveyor flow rate;

wherein the conveyor comprises a conveyor drive and further comprising a drive force sensor operative to sense a drive force exerted by the conveyor drive, and wherein the flow rate control processor is operative to increase or decrease the discharge flow rate to maintain the drive force at a level selected to provide the maximum conveyor flow rate.

7. The system of claim 6 wherein the conveyor drive comprises a power take-off shaft connected to a tractor power take-off, and wherein the drive force sensor is operative to determine a torque exerted on the power take-off shaft.

8. The system of claim 6 wherein the conveying device is driven by a hydraulic motor, and comprising a pressurized hydraulic fluid source connected to an input port of the hydraulic motor and a pressure sensor operative to sense a hydraulic fluid pressure at the input port.

9. The system of claim 1 wherein the flow rate control processor comprises a gate actuator operative to move the discharge gate and the wherein the flow rate control processor is operative to activate the gate actuator to control the size of the container discharge opening to increase or decrease the discharge flow rate.

10. The system of claim 1 wherein the container discharge opening is oriented substantially horizontally and the conveyor intake comprises a hopper with sloping hopper walls configured to receive granular material from the container discharge opening and direct same to an exposed portion of the conveying device, wherein the hopper walls are oriented with respect to the container discharge opening such that when the container discharge opening is fully open, granular material flowing from the container discharge opening is contained in the hopper and the discharge flow rate is equal to the conveyor flow rate, and wherein the flow rate control processor is operative to increase or decrease a vertical distance between the container discharge opening and the exposed portion of the conveying device to correspondingly increase or decrease the discharge flow rate to provide the maximum conveyor flow rate.

11. A conveyor capacity control system comprising:
a conveyor operative to receive granular material at a conveyor intake thereof and convey received granular material to a conveyor discharge thereof with a conveying device at a conveyor flow rate up to a maximum conveyor flow rate;
a granular material container with a container discharge opening oriented to discharge granular material from the granular material container into the conveyor intake, and a discharge gate movable to open and close the container discharge opening and control a size of the container discharge opening;
a flow rate control processor operative to determine the maximum conveyor flow rate and detect when a discharge flow rate of granular material from the container discharge opening into the conveyor intake is greater than or less than the maximum conveyor flow rate, and operative to increase or decrease the discharge flow rate to substantially coincide with the maximum conveyor flow rate;
wherein the conveyor intake comprises:
a hopper with sloping hopper walls and a flexible chute attached to the hopper walls;
a chute top actuator operative to move a top end of the flexible chute from a lowered idle position to a raised operating position;
wherein when the flexible chute is in the operating position, the flexible chute and hopper are configured to receive granular material from the container discharge opening and direct same to an exposed portion of the conveying device, wherein the flexible chute and hopper walls are oriented with respect to the container discharge opening such that when the container discharge opening is fully open, granular material flowing from the container discharge opening is contained in the flexible chute and the hopper and the discharge flow rate is equal to the conveyor flow rate;
a chute bottom actuator operative to raise and lower a bottom end of the flexible chute to correspondingly increase and decrease the discharge flow rate.

12. A conveyor capacity control system comprising:
a conveyor operative to receive granular material at a conveyor intake thereof and convey received granular material to a conveyor discharge thereof with a conveying device at a conveyor flow rate up to a maximum conveyor flow rate;
a granular material container with a container discharge opening oriented to discharge granular material from the granular material container into the conveyor intake, and a discharge gate movable to open and close the container discharge opening and control a size of the container discharge opening;
a flow rate control processor operative to determine the maximum conveyor flow rate and detect when a discharge flow rate of granular material from the container discharge opening into the conveyor intake is greater than or less than the maximum conveyor flow rate, and operative to increase or decrease the discharge flow rate to substantially coincide with the maximum conveyor flow rate; and
wherein:
the container discharge opening is in a middle bottom portion of the granular material container and oriented substantially horizontally;
the conveyor comprises a transfer conveyor section and a main conveyor section;
the transfer conveyor section is configured to extend under the granular material container and is operative to receive granular material from the horizontal container discharge opening at the conveyor intake;
the conveyor intake comprises a hopper with sloping hopper walls configured to receive granular material from the container discharge opening and direct same to an exposed portion of the conveying device at an outer end of the transfer conveyor section;
the hopper walls are oriented with respect to the container discharge opening such that when the container discharge opening is fully open, granular material flowing from the container discharge opening is contained in the hopper, and such that the discharge flow rate is equal to the conveyor flow rate;
the main conveyor section slopes upward from an inner end of the transfer conveyor section and is operative to convey the received granular material to the conveyor discharge at the conveyor flow rate.

13. The system of claim 12 wherein the flow rate control processor is operative to increase or decrease a vertical distance between the container discharge opening and the exposed portion of the conveying device to correspondingly increase or decrease the discharge flow rate to provide the maximum conveyor flow rate.

14. The system of claim 13 wherein the container discharge opening comprises a flexible chute with a top end attached to a bottom of the granular material container and extending downward from the granular material container to a bottom end above the exposed portion of the conveying device and wherein the flow rate control processor is operative to raise the bottom end of the flexible chute to increase the discharge flow rate and lower the bottom end of the flexible chute to decrease the discharge flow rate, and wherein the flow rate control processor is operative to stop the conveying device to reduce the discharge flow rate to zero.

15. The system of claim 13 wherein the transfer conveyor section is movable such that the conveyor intake can move up and down with respect to the main conveyor section from a lowered position to a raised position, and wherein the flow rate control processor is operative to raise the conveyor intake to decrease the discharge flow rate and lower the conveyor intake to increase the discharge flow rate, and wherein the flow rate control processor is operative to stop the conveying device to reduce the discharge flow rate to zero.

16. The system of claim 12 wherein the conveying device is one of an auger and a belt.

17. The system of claim 12 wherein the conveying device is a belt and the transfer conveyor section comprises a transfer belt moving at a transfer belt speed and the main conveyor section comprises a main belt moving at a main belt speed and wherein the flow rate control processor is operative to increase or decrease the transfer belt speed to increase or decrease the discharge flow rate to substantially coincide with the maximum conveyor flow rate, and wherein the flow rate control processor is operative to stop the transfer belt to reduce the discharge flow rate to zero.

18. The system of claim 12 wherein the flow rate control processor comprises a conveyor speed sensor operative to determine a conveyor speed of the conveying device, and wherein the maximum conveyor flow rate is determined by calibrating the conveyor to determine an optimum conveyor speed that provides the maximum conveyor flow rate and the flow rate control processor is operative to increase or decrease the discharge flow rate to maintain the conveyor speed at the optimum conveyor speed.

19. The system of claim 12 wherein the flow rate control processor comprises a conveyor speed sensor operative to determine a conveyor speed of the conveying device in the main conveyor section, and a weighing system operative to determine a conveyor weight of the main conveyor section, wherein the conveyor speed decreases as a material weight of granular material on the conveyor increases, and wherein the flow rate control processor is operative to determine the conveyor flow rate and increase or decrease the discharge flow rate to provide the maximum conveyor flow rate.

20. The system of claim 19 wherein the flow rate control processor is operative to determine a conveyed weight of granular material conveyed in a selected period.

21. The system of claim 1 wherein the conveyor discharge is oriented to discharge granular material into a vessel, and comprising a fill indicator connected to the flow rate control processor and wherein the flow rate control processor is operative to reduce the discharge flow rate to zero when the fill indicator indicates that a desired amount of granular material has been discharged into the vessel.

22. A conveyor capacity control system comprising:
a conveyor operative to receive granular material at a conveyor intake thereof and convey received granular material to a conveyor discharge thereof with a conveying device at a conveyor flow rate up to a maximum conveyor flow rate;
a granular material container with a container discharge opening oriented to discharge granular material from the granular material container into the conveyor intake, and a discharge gate movable to open and close the container discharge opening and control a size of the container discharge opening;
a flow rate control processor operative to determine the maximum conveyor flow rate and detect when a discharge flow rate of granular material from the container discharge opening into the conveyor intake is greater than or less than the maximum conveyor flow rate, and operative to increase or decrease the discharge flow rate to substantially coincide with the maximum conveyor flow rate;
wherein:
the granular material container is a box mounted on a truck frame and comprising a hoist operative to pivot a front end of the box upward about a horizontal pivot axis at the rear of the truck frame so the products in the box flow out through the container discharge opening in the lower rear wall of the box;
a gate actuator is operative to move the discharge gate and the wherein the flow rate control processor is operative to activate the gate actuator to control the size of the container discharge opening to increase or decrease the discharge flow rate;
a granular material sensor mounted inside the box above the container discharge opening and operative to indicate to the flow rate control processor when granular material is below the granular material sensor; and
the flow rate control processor is operative activate the hoist to raise the front end of the box upward to maintain granular material above the flow material sensor.

23. The system of claim 22 further comprising a tilt sensor mounted on the box and operative to indicate to the flow rate control processor that the box is tilted to the right or left beyond a selected safe degree of tilt, and wherein the flow rate control processor is operative to prevent the hoist from raising the front end of the box when the box is tilted beyond the safe degree of tilt.

24. A discharge system for a granular material box mounted on a truck frame with a hoist operative to pivot a front end of the box upward about a horizontal pivot axis at the rear of the truck frame so the products in the box flow out through a box discharge opening in the lower rear wall of the box, the system comprising:
a discharge gate movable to control the size of the discharge opening to increase or decrease a discharge flow rate of granular material from the box discharge opening;
a granular material sensor mounted inside the box above the box discharge opening and operative to indicate to a hoist controller when granular material is below the granular material sensor; and
wherein the hoist controller is operative activate the hoist to raise the front end of the box upward to maintain granular material above the flow material sensor as granular material flows out of the box through the box discharge opening.

25. The system of claim 24 further comprising a tilt sensor mounted on the box and operative to indicate to the hoist controller that the box is tilted to the right or left beyond a selected safe degree of tilt, and wherein the hoist controller is operative to prevent the hoist from raising the front end of the box when the box is tilted beyond the safe degree of tilt.

26. The system of claim 24 further comprising:
- a conveyor operative to receive granular material discharged through the box discharge opening at a conveyor intake thereof and convey received granular material to a conveyor discharge thereof with a conveying device at a conveyor flow rate up to a maximum conveyor flow rate;
- a gate actuator operative to move the discharge gate;
- a flow rate control processor operative to detect when the discharge flow rate is greater than or less than the maximum conveyor flow rate, and operative to move the discharge gate to increase or decrease the discharge flow rate to substantially coincide with the maximum conveyor flow rate.

27. The system of claim 26 comprising a conveyor speed sensor operative to determine a conveyor speed of the conveying device, and wherein the maximum conveyor flow rate is determined by calibrating the conveyor to determine a optimum conveyor speed that provides the maximum conveyor flow rate and the flow rate control processor is operative to increase or decrease the discharge flow rate to maintain the conveyor speed at the optimum conveyor speed.

28. The system of claim 26 wherein the flow rate control processor comprises a conveyor speed sensor operative to determine a conveyor speed of the conveying device, and a weighing system operative to determine a weight of granular material on the conveyor, wherein the conveyor speed decreases as the weight of granular material on the conveyor increases, and wherein the flow rate control processor is operative to determine the conveyor flow rate and adjust the conveyor speed to provide the maximum conveyor flow rate.

29. The system of claim 26 wherein the conveying device is an auger and the conveyor intake comprises a hopper with sloping hopper walls configured to receive the granular material from the container discharge opening and direct same to an exposed portion of the auger, and wherein when the discharge flow rate is greater than the maximum conveyor flow rate, a pile of granular material builds up above the exposed portion of the auger, and wherein the flow rate control processor is operative to monitor a height of the pile and increase or decrease the discharge flow rate to maintain the pile at a substantially constant height.

30. The system of claim 24 wherein the conveyor discharge is oriented to discharge granular material into a vessel, and comprising a fill indicator connected to the flow rate control processor and wherein the flow rate control processor is operative to reduce the discharge flow rate to zero when the fill indicator indicates that a desired amount of granular material has been discharged into the vessel.

31. A method of controlling a conveyor for conveying granular material, the method comprising:
- discharging granular material from a granular material container through a container discharge opening, and the granular material container comprising a discharge gate operative to control a size of the container discharge opening;
- orienting a conveyor intake of the conveyor to receive granular material from the container discharge opening and conveying received granular material to a conveyor discharge of the conveyor with a conveying device at a conveyor flow rate up to a maximum conveyor flow rate;
- determining the maximum conveyor flow rate;
- detecting when a discharge flow rate of granular material from the container discharge opening into the conveyor intake is greater than or less than the maximum conveyor flow rate, by driving the conveyor with a conveyor drive and sensing a drive force exerted by the conveyor drive, and increasing or decreasing the discharge flow rate to maintain the drive force at a level selected to provide the maximum conveyor flow rate.

* * * * *